US006766331B2

(12) United States Patent
Shema et al.

(10) Patent No.: US 6,766,331 B2
(45) Date of Patent: Jul. 20, 2004

(54) METHOD, COMPUTER PROGRAM PRODUCT, AND SYSTEM FOR CREATING AND VIEWING AN INTELLIGENT GRAPHICS FILE INCLUDING PARTS INFORMATION

(75) Inventors: David B. Shema, Seattle, WA (US); John H. Boose, Bellevue, WA (US)

(73) Assignee: The Boeing Company, Seattle, WA (US)

( * ) Notice: Subject to any disclaimer, the term of this patent is extended or adjusted under 35 U.S.C. 154(b) by 224 days.

(21) Appl. No.: 09/971,155

(22) Filed: Oct. 4, 2001

(65) Prior Publication Data
US 2002/0194190 A1 Dec. 19, 2002

Related U.S. Application Data

(60) Provisional application No. 60/280,316, filed on Mar. 29, 2001.

(51) Int. Cl.[7] .............................................. G06F 17/30
(52) U.S. Cl. ...................................... 707/102; 707/101
(58) Field of Search ........................ 707/10, 101, 104.1, 707/102; 345/418, 619, 866; 434/365; 700/96, 103; 705/400; 715/502, 526

(56) References Cited

U.S. PATENT DOCUMENTS

| 5,386,508 A | | 1/1995 | Itonori et al. |
| 5,623,679 A | * | 4/1997 | Rivette et al. ............... 715/526 |
| 5,717,595 A | * | 2/1998 | Cherrington et al. ........ 705/400 |
| 5,761,328 A | | 6/1998 | Solberg et al. |
| 5,825,651 A | * | 10/1998 | Gupta et al. ................. 700/103 |
| 5,867,596 A | | 2/1999 | Kano et al. |
| 5,895,473 A | | 4/1999 | Williard et al. |
| 6,134,338 A | | 10/2000 | Solberg et al. |

* cited by examiner

Primary Examiner—Diane D. Mizrahi
Assistant Examiner—Apu Mofiz
(74) Attorney, Agent, or Firm—Alston & Bird LLP

(57) ABSTRACT

A method, computer program product, and system for creating and viewing an intelligent graphics file including information associated with the parts depicted in the graphics file are provided. Graphics is automatically transformed into a format that provides enriched electronic display of the graphic containing reference designation links and access to information associated with the parts depicted in the graphic. Relationships among the reference designations and the ability to access textual information associated with the reference designations of the parts are embedded in the graphic. The part and the corresponding textual information when the reference designator associated with the part is selected is automatically displayed. An intelligent graphics file that allows a user to quickly and accurately find, view and navigate among the parts of an article depicted in a graphic and the corresponding textual information for the parts is automatically produced.

29 Claims, 10 Drawing Sheets

METHOD, COMPUTER PROGRAM PRODUCT, AND SYSTEM FOR CREATING AND VIEWING AN INTELLIGENT GRAPHICS FILE INCLUDING PARTS INFORMATION

CROSS-REFERENCE TO RELATED APPLICATIONS

This application claims priority from a provisional patent application Serial No. 60/280,316, filed Mar. 29, 2001, the contents of which are incorporated by reference in their entirety.

FIELD OF THE INVENTION

This invention relates to electronic graphics having embedded access to parts information and, more particularly, to a method, computer program product and system that provide automated transformation of graphics into an enriched electronic display containing related reference designation links and access to information associated with the parts depicted in the graphic.

BACKGROUND OF THE INVENTION

Complex and detailed illustrations, such as parts catalogs and other technical drawings, are commonly depicted in a hard copy form consisting of multiple pages of drawings. Alternatively, the separate drawings may be depicted in electronic graphic form. The drawings contain large amounts of information regarding the parts depicted in the drawings or graphics and the connections and relationships among the parts. Some of the information contained in the drawings or graphics is explicit, such as labels or other text. Other sources of drawing or graphic information are implicit, such as the symbols or configurations.

When a user needs information concerning a specific part depicted in the drawings or graphics, the user must manually search through each page of a large set of drawings or a catalog, either on paper or on-line. For example, in industries that depend on complex technical drawings, manuals and parts catalogs for information about its systems, users must manually search many pages of drawings or catalogs before they can perform maintenance or troubleshoot the system. This typically becomes a lengthy process because the user must study the drawings or graphics to determine the way in which the drawings relate to each other and ensure he has all the drawings concerning the particular part of the system at issue. For instance, a part from one drawing or graphic may also be depicted on one or more of the other drawings or graphics. Thus, the drawings or graphics may have multiple references to the same part, both graphically and in the textual information associated with the part. Searching the hard copies of the parts catalogs and/or manuals to find all of the graphical and textual references to a specific part is very difficult, tedious and time-consuming because of the massive amounts of information they contain. Even if the parts catalogs and/or manuals are on-line, the user nevertheless must repeatedly "pan" and "zoom" to find the exact information that they need.

Once users collect all of the drawings, parts catalogs and manuals necessary to provide a comprehensive view of the system upon which they plan to work, they must carry the drawings, catalogs and/or manuals with them to perform the work. Otherwise, the user runs the risk of having to repeatedly return to the central repository of the drawings, catalogs and manuals. If the user realizes he needs drawings and information regarding another part of the system while working, then he must again commence the lengthy searches described above.

As the above discussion illustrates, the process of manually locating and attaining drawings or textual information for a specific part from a large set of drawings, parts catalogs or manuals is a daunting task, even for an experienced user. The process gets much more complicated when the user must also obtain all of the drawings or textual information related to the specific part that is provided by parts catalogs or other manuals. For example, finding each occurrence of a particular part number, detail label or text in a parts catalog generally becomes a very lengthy process because the user must consult large indices of information associated with the parts and determine which reference refers to the particular part at issue. Thus, manually searching large sets of drawings, parts catalogs or manuals for particular parts of a system and obtaining all of the drawings and/or textual information related to that part, is an inefficient, error-prone and expensive endeavor.

For the reasons discussed above, there exists a need for a system that processes complex graphic files to provide users with fast and accurate access to information contained in large sets of drawings, parts catalogs and/or manuals. More particularly, the need is for a system that efficiently performs automated transformation of graphics into an enriched electronic display containing reference designation links and information associated with the parts depicted in the graphic.

SUMMARY OF THE INVENTION

In accordance with this invention, a method, computer program product, and system for creating and viewing an intelligent graphics file including information associated with the parts of at least one article are provided. The method, computer program product, and system automatically transform graphics into a format that provides enriched electronic display of the graphic containing reference designation links and access to information associated with the parts depicted in the graphic. Relationships among the reference designations and the ability to access textual information associated with the reference designations of the plurality of parts depicted in the graphic are embedded in the intelligent graphics file. The method, computer program product, and system of the present invention therefore automatically display the particular part and the textual information for that part when the reference designator associated with the part is selected. As such, the present invention automatically produces an intelligent graphics file that allows a user to quickly and accurately find, view and navigate among the parts depicted in a graphic and access the information associated with the parts. The present invention is advantageous because it does not require the user to manually search through large parts manuals. Moreover, the present invention does not require the system builder to manually re-author electronic drawing sets. Therefore, the method, computer program product, and system of the present invention provide an efficient and accurate approach to creating and viewing intelligent graphics files including information associated with the parts depicted in the graphic file that completely avoids the time-consuming and expensive steps of the conventional approaches.

In general, the method, computer program product, and system of the present invention create an intelligent graphics file that includes the ability to access information associated with the parts of the article or articles depicted in the graphics file. Once a graphic representation of the parts of the article and information identifying the reference designations for the parts are provided, the present invention constructs a computer readable object defining the related reference designations. The computer readable object contains the position and content of the reference designations and indicates the related reference designations. The related reference designations are labels that refer to common parts depicted in different portions of the graphic file. The computer readable object then may be combined with the graphic representation to create the intelligent graphics file. The intelligent graphics file therefore may contain both graphic representations of the parts of the article and embedded data structures that define the related reference designations associated with the graphic representations of the same part.

The method, computer program product, and system of the present invention also may provide access to textual information associated with the parts depicted in the graphic representation. The computer readable object may identify the textual information corresponding to a respective part of the article and when the computer readable object is combined with the graphic representation, the resulting intelligent graphic file contains graphics and embedded data structures that identify the textual information. Additionally, the method, computer program product, and system of the present invention may include a database to store the textual information associated with the parts depicted in the graphic representation from which textual information associated with the parts may be extracted. Enabling the textual information to be immediately accessed and displayed in the manner described above saves time and money for users who otherwise would have to look up the textual information in separate indices after finding the illustration of the part in a catalog.

The method, computer program product, and system of the present invention may also provide embodiments in which the computer readable object and, therefore, the embedded data structures in the intelligent graphics file contain instructions to magnify related reference designations. Thus, when the reference designation is "pointed to" or selected, the reference designation may be magnified for emphasis. For purposes of the present invention, "pointing to" is defined as the movement of a cursor on a display via a selection device, such as a mouse, near the reference designation at issue, without selecting the reference designation, i.e., by placing the cursor on the reference designation without clicking on the reference designation. Magnifying the related reference designations further clarifies the complicated graphics for the user by noticeably indicating where the reference designations are located on the graphic or graphics, further providing the user with a fast and accurate search of graphics.

The present invention also includes a method, computer program product, and system for viewing an intelligent graphics file including information associated with the parts of the article depicted in the graphic representation. Once the intelligent graphics file with both graphic representations of the parts of the article and embedded data structures defining related reference designations associated with the graphic representations of the same part is provided, a graphical image of at least a portion of the article based on the graphic and embedded data structures stored in the intelligent graphics file may be displayed. A user interface of the present invention allows a user to interact with the drawing and move a cursor via a selection device, such as a mouse, to indicate on the display related reference designations and the selection of a reference designation. The present invention may receive selections of reference designations associated with the part of the article being displayed. Upon receiving a selection of a reference designation associated with a part, the present invention may display the textual information associated with the part. In addition, the present invention may concurrently display a graphical representation of the part of the article associated with the selected reference designation.

Further embodiments of the method, computer program product, and system of the present invention include viewing an intelligent graphics file that contains a graphic representation of multiple sheets of a drawing set depicting the parts of the article. When the present invention displays the graphical representation of the part associated with a selected reference designation, the graphical representation of the part may be depicted on a different sheet of the drawing set than the sheet having the selected reference designation. Additionally, the method, computer program product, and system of the present invention also may include embodiments in which a reference designation associated with a part of the article being displayed may be "pointed to" with a selection device, such as a mouse. After the reference designation is pointed to, but before the reference designation is selected, a window containing textual information for the part associated with the reference designation is displayed. Thus, instead of requiring the user to manually search or electronically "pan" and "zoom" through large drawing sets and indices or databases or parts information, these embodiments enable a user to efficiently search graphical representations of large drawing sets and have fast access to specific parts information.

The method, computer program product, and system of the present invention also may involve providing a link in the intelligent graphics file that is associated with a respective reference designation such that the link associates the respective reference designations with the corresponding textual information. Thus, when a reference designation is selected, the present invention may obtain and display the textual information for the part associated with the selected reference designation. Additionally, the method, computer program product, and system of the present invention may store the textual information associated with the respective reference designations for the parts depicted in the graphic representation in a database. When a reference designation is selected in this embodiment, the present invention may obtain and display the textual information for the part associated with the selected reference designation from the database. The immediate access and display of the textual information as described in these embodiments saves time and money for users who otherwise would have to look up the textual information in separate indices after finding the illustration of the part in a catalog.

The method, computer program product, and system of the present invention also may include embodiments that incorporate graphic file representations of electrical wiring diagrams depicting the parts also depicted in the intelligent graphics file. For example, when a reference designation in the intelligent graphics file is selected in this embodiment, the present invention may display the portion of an electrical wiring diagram depicting the part associated with the selected reference designation. The present invention therefore provides efficient navigation within separate graphic files by recognizing the common elements of the separate graphic files and providing links among the common elements.

Thus, the method, computer program product, and system of the present invention provide for automatically building an intelligent graphics file having both graphic representations of the parts of articles and embedded data structures defining related reference designations associated with the graphic representations of the same part. The present invention may also provide for automatically displaying parts information corresponding to the part represented by a selected reference designation. The textual parts information may be displayed whether the respective reference designation is pointed to or selected. Furthermore, the parts information may be obtained from a database that stores the textual parts information associated with the parts of the article. The features of the various embodiments of the present invention provide users and electronic graphic system builders with an efficient and accurate approach to creating and viewing intelligent graphics files that include navigation among reference designations for the same part and access to textual information associated with the parts, which completely avoids the time-consuming and expensive steps of the other approaches.

BRIEF DESCRIPTION OF THE DRAWINGS

Figure 1:
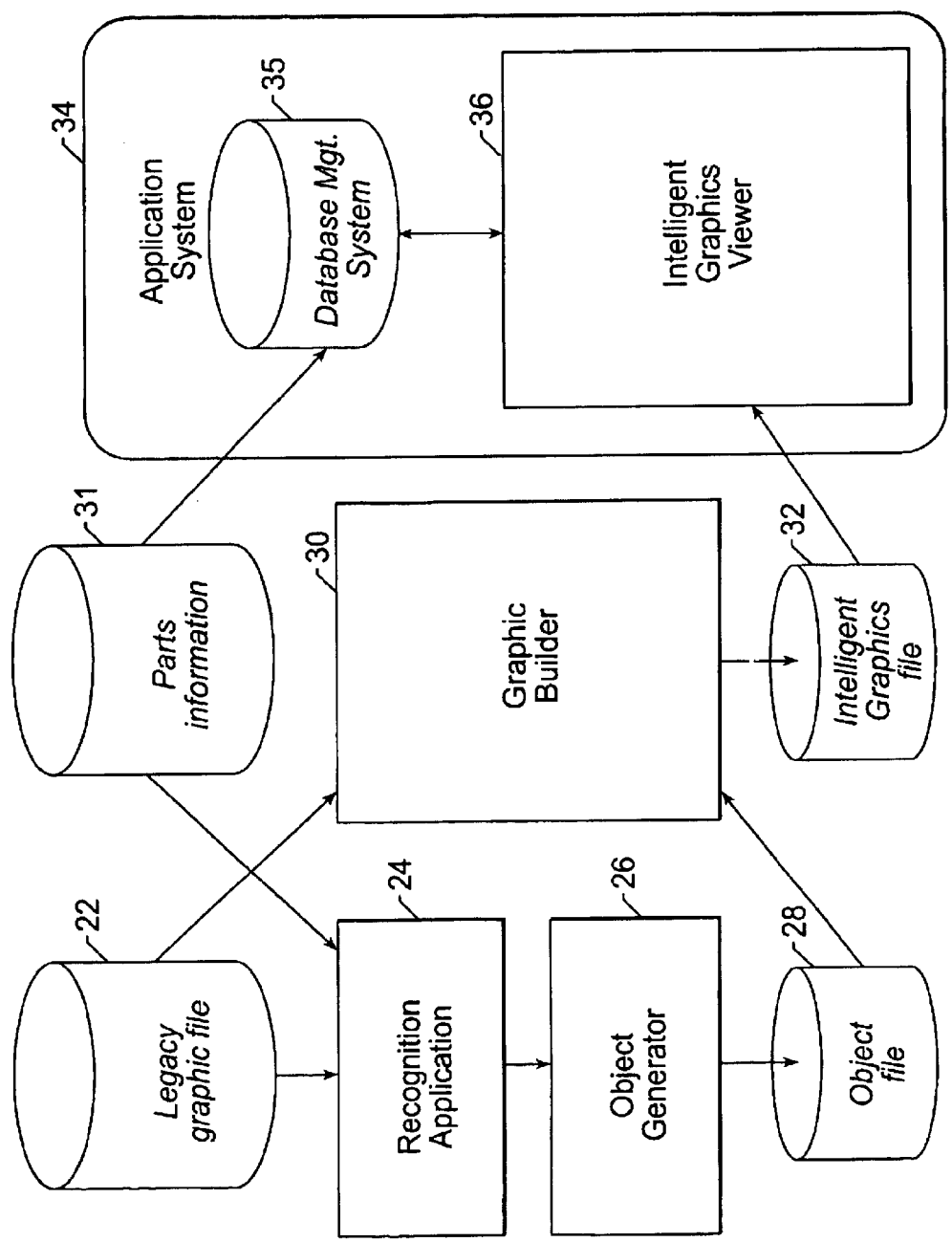
Figure 2:
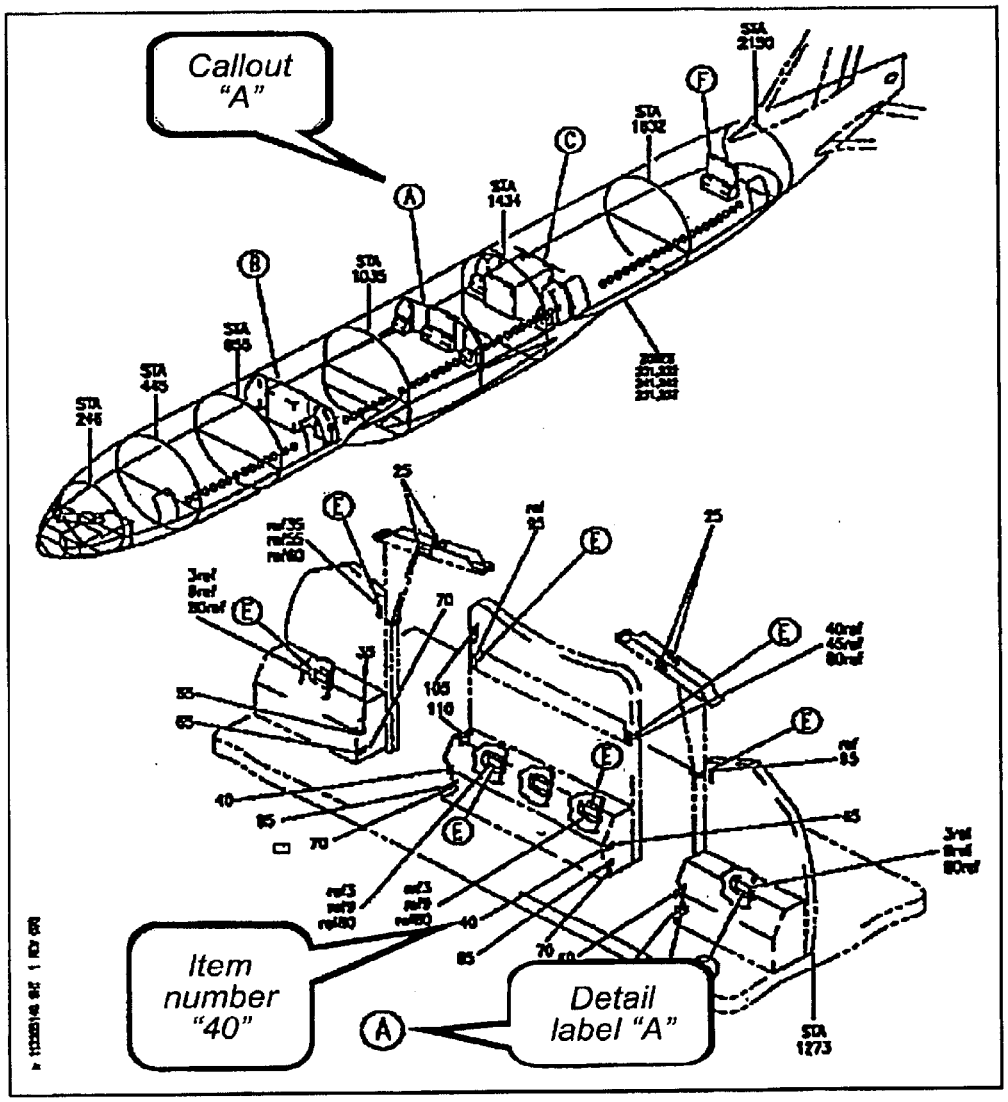
Figure 3:
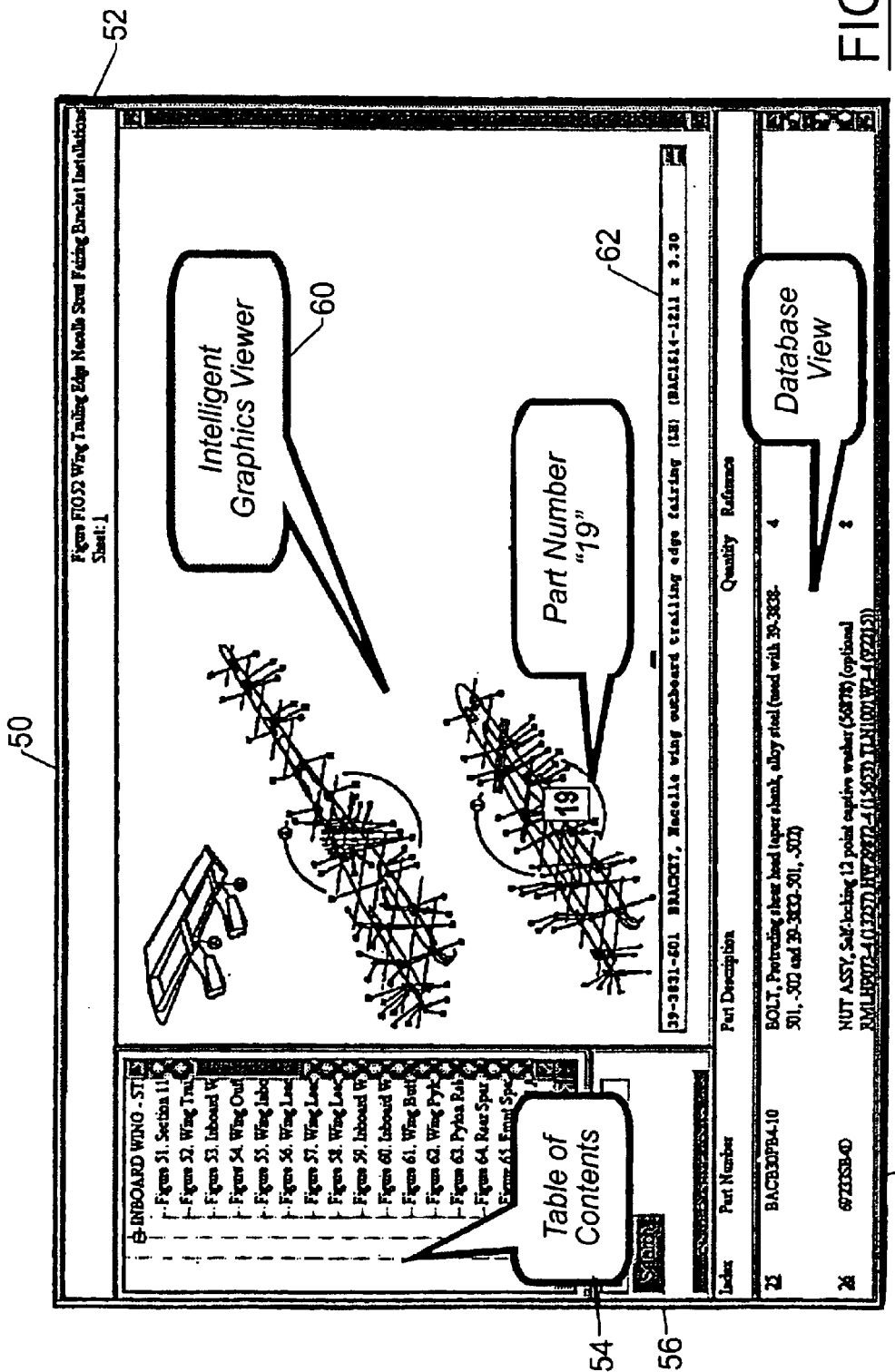
Figure 4:
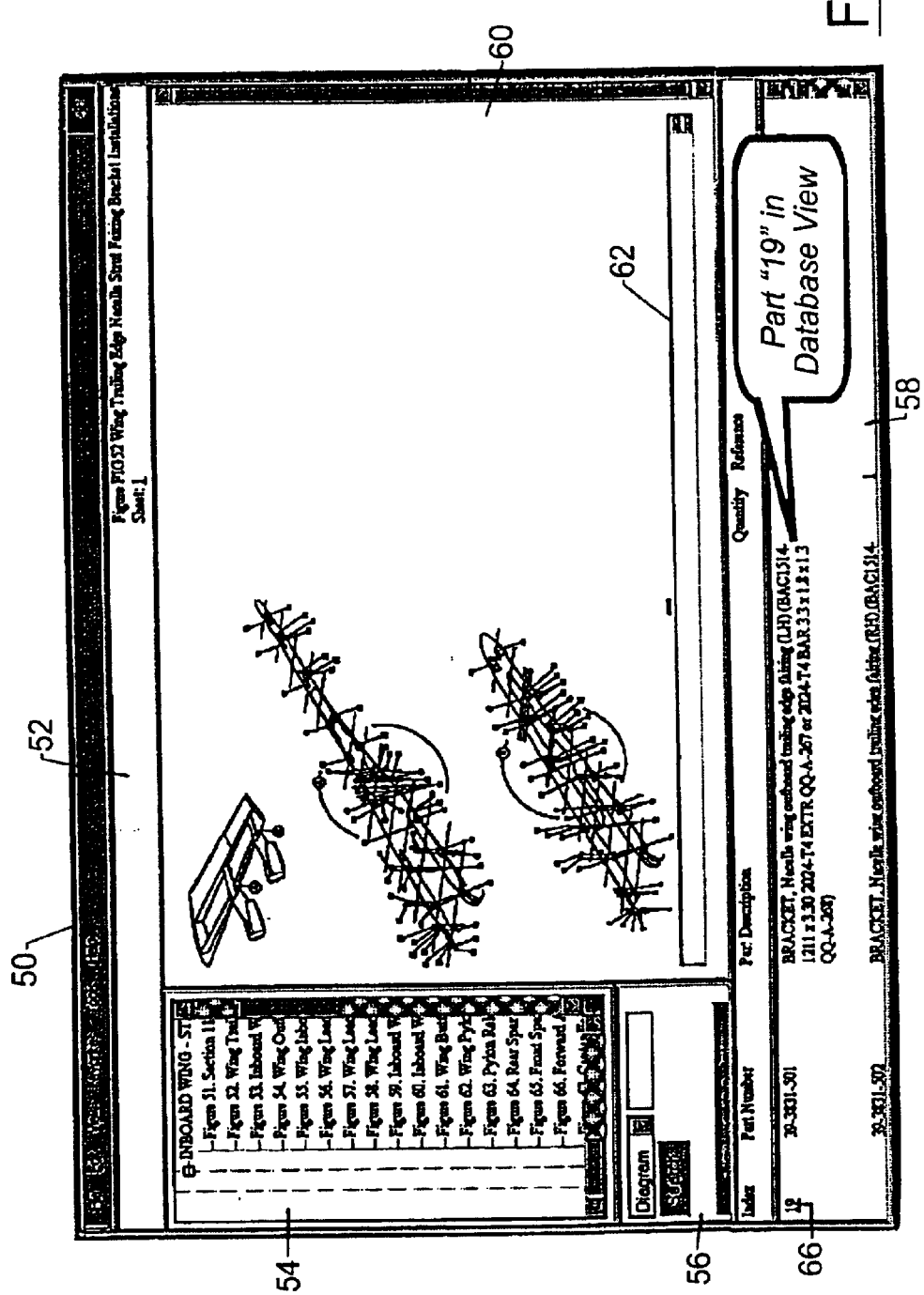
Figure 5:
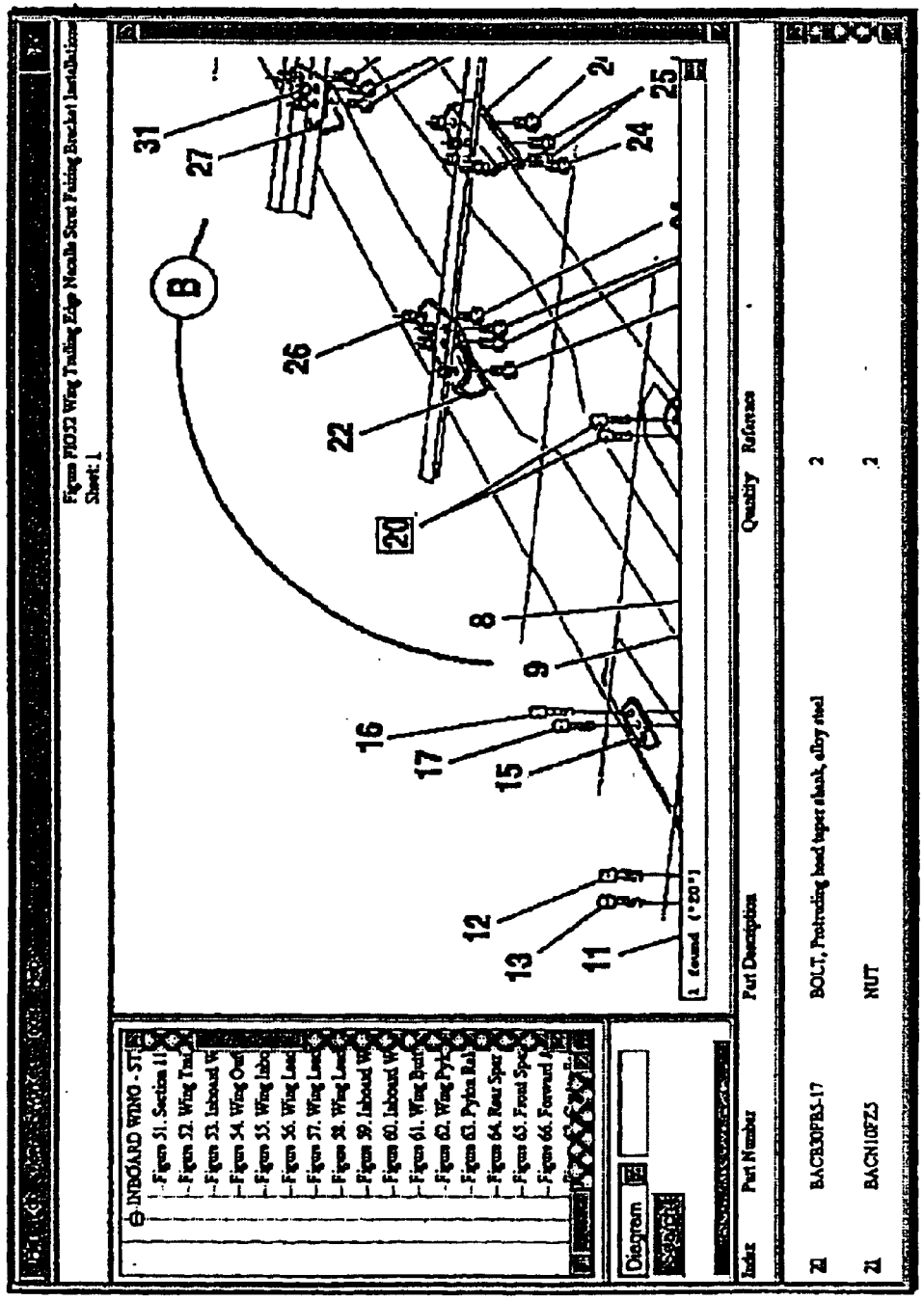
Figure 6:
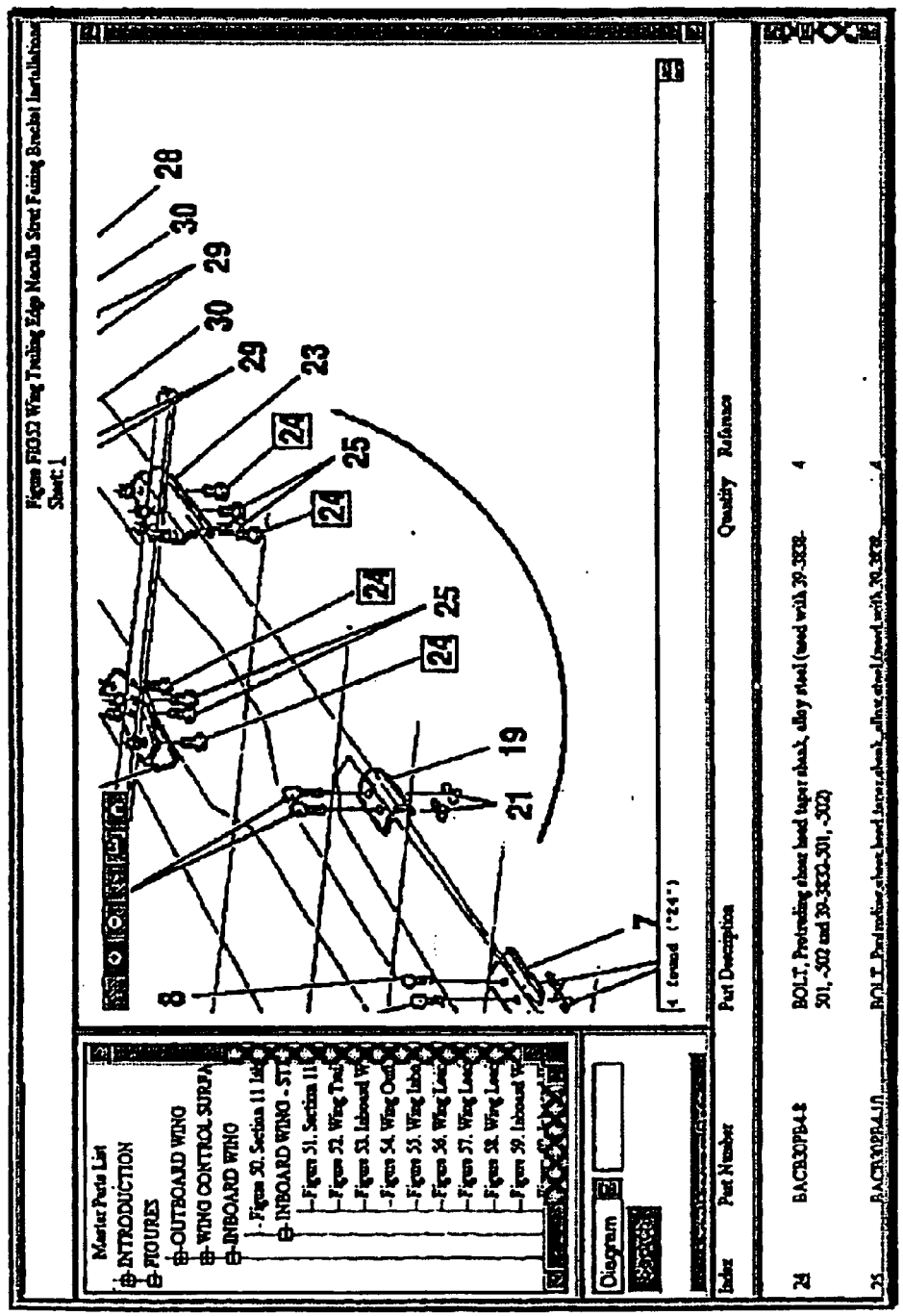
Figure 7:
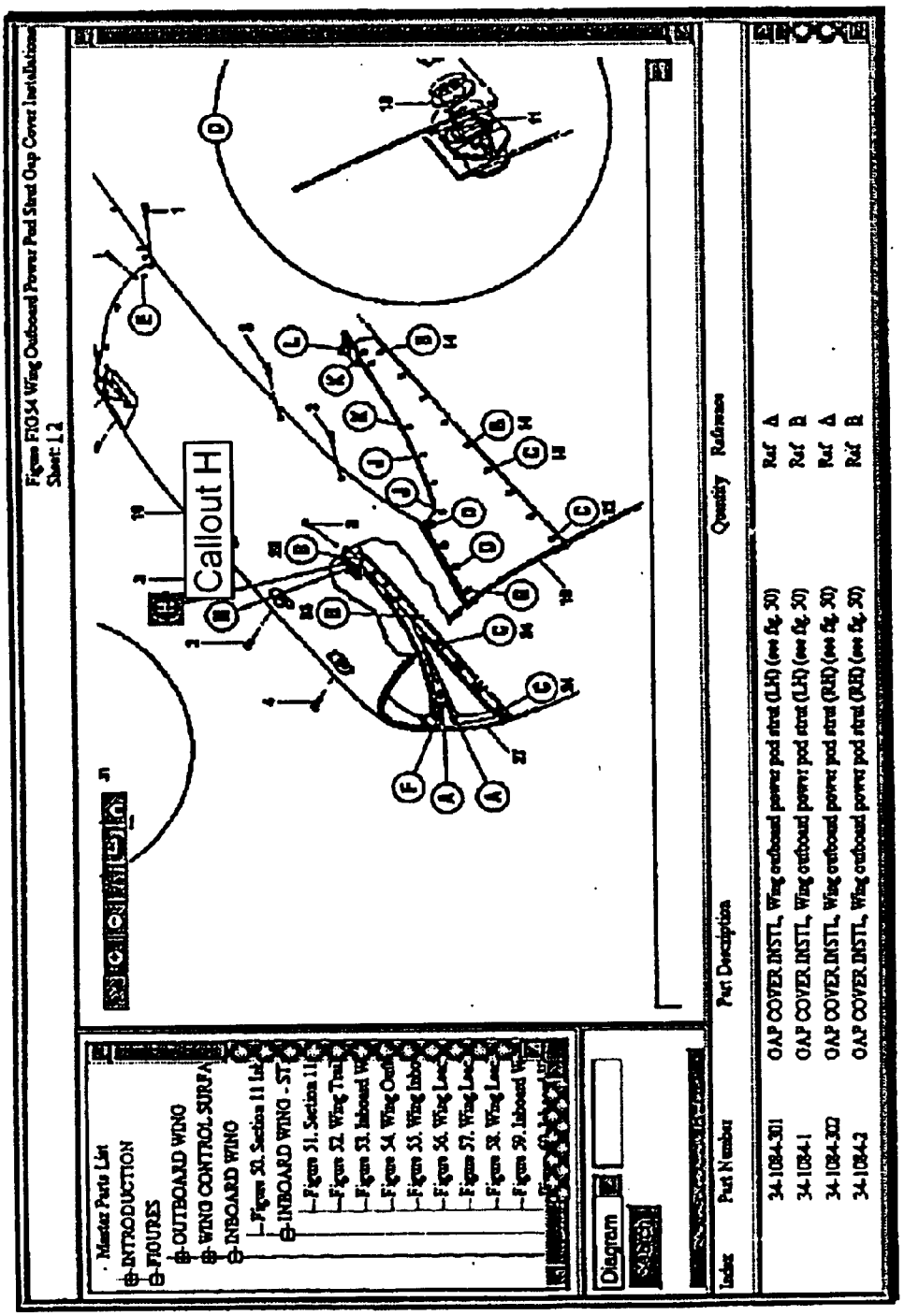
Figure 8:
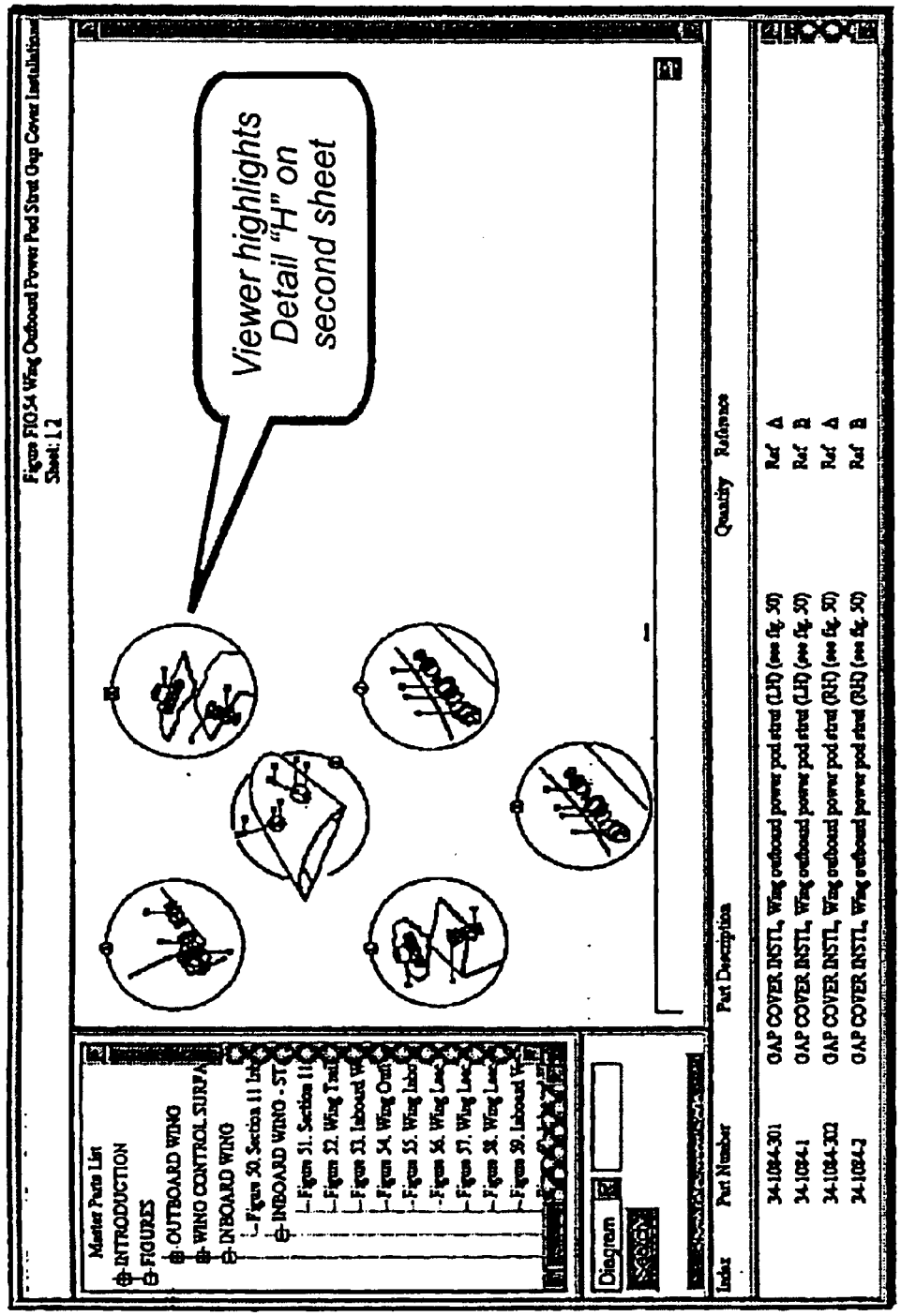
Figure 9:
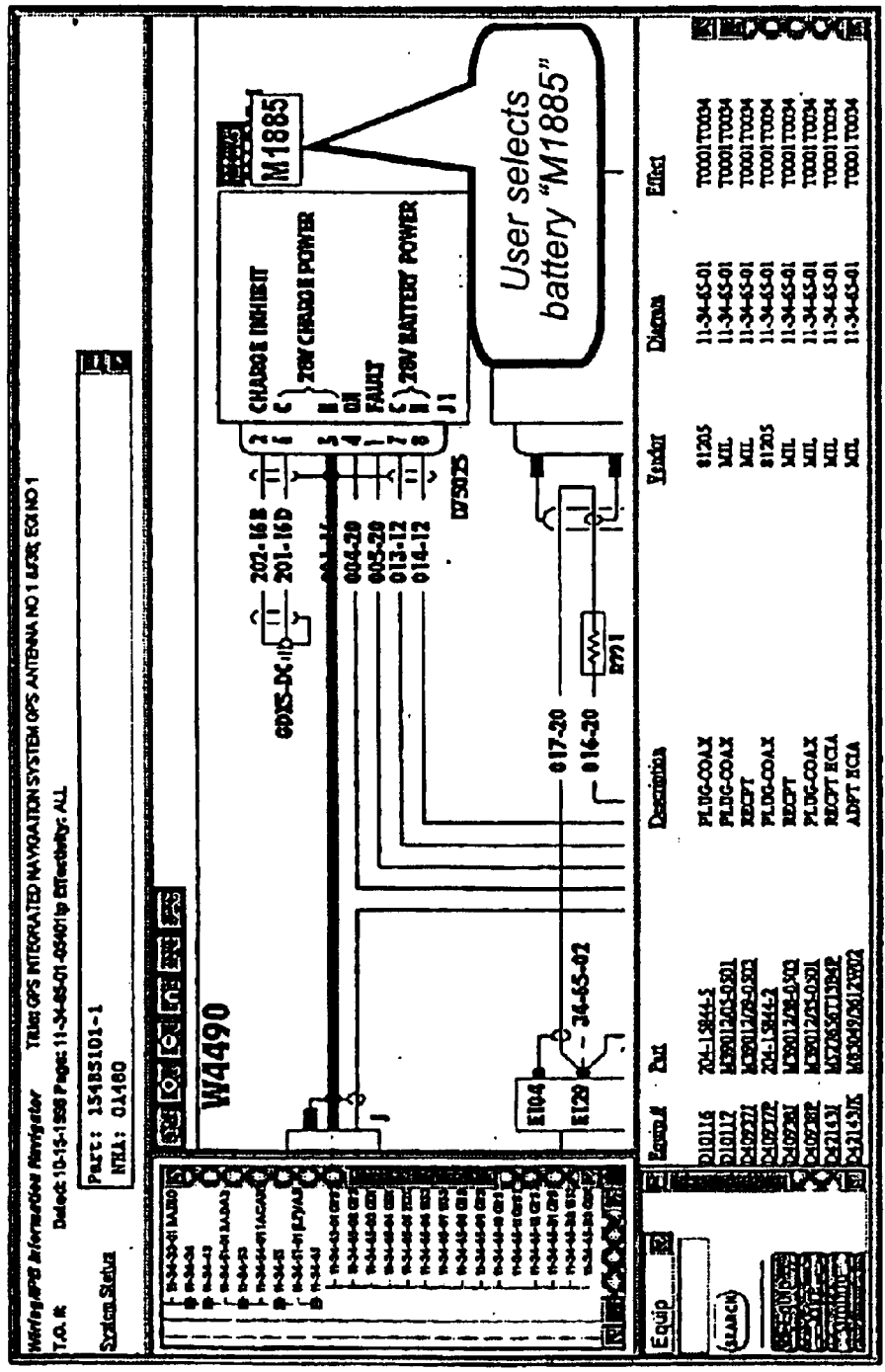
Figure 10:
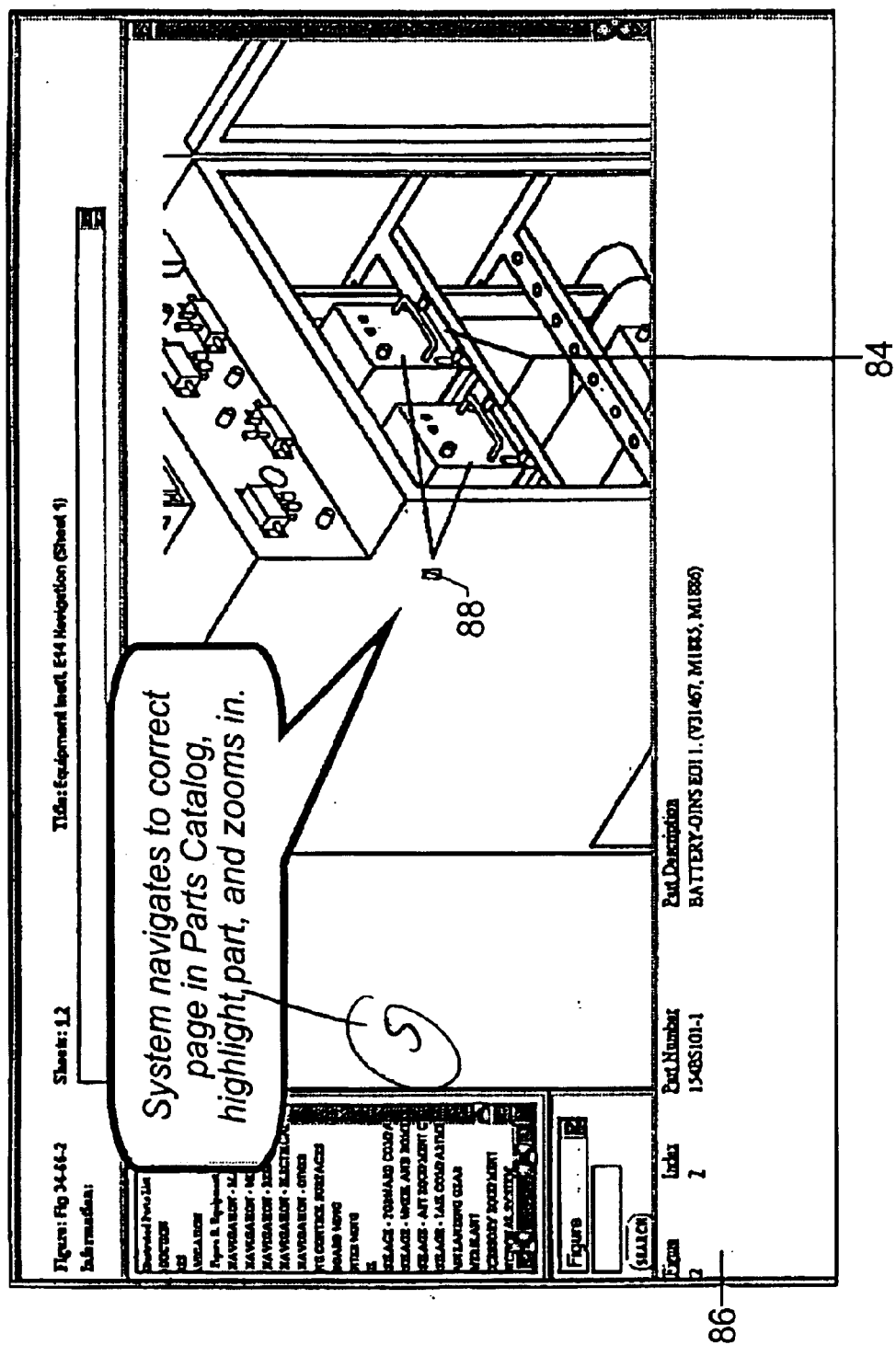

Having thus described the invention in general terms, reference will now be made to the accompanying drawings, which are not necessarily drawn to scale, and wherein:

FIG. 1 is a block diagram illustrating the operations performed by the method, computer program product, and system of one embodiment of the present invention;

FIG. 2 is a typical graphic from a parts catalog depicting callout reference designations, detail label reference designations, and item number reference designations;

FIG. 3 is a representative display, provided according to one embodiment of the present invention, which enables the user to view and navigate among the graphics and parts information, here showing the display when the reference designation for part number 19 is pointed to with a selection device, such as a mouse, such that the part number is magnified and textual information associated with that part is displayed in a box below the part;

FIG. 4 is a representative display, provided according to one embodiment of the present invention, when the reference designation for part number 19 is selected which illustrates that the database view automatically scrolls to the textual information associated with that part;

FIG. 5 is a representative display, provided according to one embodiment of the present invention, following the selection of part 20 in the parts database display and illustrating the highlighting and zooming to the portion of the graphic representing the reference designation corresponding to part 20;

FIG. 6 is a representative display, provided according to one embodiment of the present invention, following the selection of part 24 in the parts database display and illustrating the display, highlighting and zooming to the portion of the graphic representing all of the reference designations corresponding to part 24;

FIG. 7 is a representative display, provided according to one embodiment of the present invention, following the selection of the reference designation for callout H in the intelligent graphic viewer;

FIG. 8 is a representative display, provided according to one embodiment of the present invention, following the selection of the reference designation for callout H illustrating the automatic display of the portion of the graphic containing the related reference designation, detail H;

FIG. 9 is a representative display, provided according to one embodiment of the present invention, following the selection of the reference designation associated with battery M1885 in the intelligent graphic viewer that is displaying an electronic wiring diagram; and FIG. 10 is a representative display, provided according to one embodiment of the present invention, following the selection of the reference designation associated with battery M1885 illustrating the automatic display of the portion of the parts catalog graphic containing the related reference designation for M1885 and the parts information for M1885 in the database viewer.

DETAILED DESCRIPTION OF THE INVENTION

The method, computer program product, and system 20 of the present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A method, computer program product, and system are provided for creating and viewing an intelligent graphics file including information associated with the parts of at least one article. The method, computer program product, and system automatically transform graphics into a format that allows enriched electronic display of the graphic having related reference designations and access to information associated with the parts depicted in the graphic. Relationships among the reference designations and the ability to access textual information associated with the reference designations of the parts are embedded in the graphic. The present invention therefore automatically displays the graphic representation and the textual information for a part when the reference designator associated with the part is selected. As such, the present invention automatically produces an intelligent graphics file that allows a user to quickly and accurately find, view and navigate among parts depicted in a graphic and have access to the information associated with the parts.

FIG. 1 is a block diagram illustrating the operations performed by the method, computer program product, and system 20 of one embodiment of the present invention. The legacy graphic file 22 is an electronic representation of an original drawing or set of drawings. For example, the legacy graphic file 22 may represent the complex drawings of the various views, with various levels of detail, of the articles contained in extensive parts catalogs. The drawings are commonly provided in paper/hard copy form, scanned paper images or other electronic graphic files, such as raster graphic files. Before the operations depicted in FIG. 1 can commence, however, the drawings must be converted to an electronic format, typically the legacy graphic file is a raster or vector graphic file.

Graphic files, such as graphics of parts catalogs, contain figures and labels that indicate how the figures relate to each other. The labels are commonly called reference designations. FIG. 2 is a typical graphic from a parts catalog depicting figures and reference designations. For example, FIG. 2 illustrates a callout reference designation "A," a detail label reference designation "A," and an item number reference designation "40." The callout reference designation "A" is related to the detail label reference designation "A" such that the detail label "A" represents a detailed view of a segment of the article represented by the callout "A." The item number reference designation "40" represents a component within the detailed view represented by the detail label "A."

Once the graphics, such as parts catalogs, are in an electronic graphic format, depicted by the legacy graphic file 22 of FIG. 1, the legacy graphic file 22 is reviewed by the recognition application 24. The recognition application 24 is a commercial application program that separates the graphic artwork from the text and performs optical character recognition (OCR) on electronic graphic files, such as raster graphic files. The recognition application 24 is provided as an image-processing engine in the form of a software library. Data and heuristics supplied by the system builder facilitate the recognition application 24 to accurately identify the reference designations and the relationships among the reference designations within the legacy graphic file 22. For example, the system builder supplies the recognition application 24 with character set examples, alphanumeric rules, character size ranges, and graphic patterns for the reference designations that the system builder may expect in the legacy graphic file 22. In the same way, the system builder may use the heuristics to manipulate which reference designations are discovered by the recognition application 24 such that certain reference designations may be ignored. The recognition application 24, thus, may discover and record the reference designations and the relationships among the reference designations present in the legacy graphic file 22. One example of a commercial application program that may serve as the recognition application 24 is Cartouche, provided by RAF Technology of Redmond, Wash. The recognition application 24 also may analyze the parts information 31, such as files provided by the parts manufacturer, to identify the textual parts information that corresponds to the reference designations discovered for the parts depicted in the legacy graphics file 22. The parts information 31 then may be stored in a database 35 to be available for extraction when desired.

Once the recognition application 24 identifies the reference designations of a legacy graphic file 22 and the relationships among the reference designations, the object generator 26 may create an object file 28, which may contain the identified information. The object generator 26 may create one object in the object file 28 for each reference designation, although the object file 28 may combine the reference designations present in the legacy graphic file 22 in various ways, if desired. The format of the object file 28 may be any computer readable format, for example a markup format, such as extensible markup language (XML) format. The object file 28 may define, for example, whether the reference designation is related to another reference designation and/or textual information and text block information to assist the automated text recognition and text search. Further details regarding text recognition and text search within graphic files is provided in U.S. Ser. No. 09/971,149 entitled The Method, Computer Program Product, and System for Performing Automated Text Recognition and Text Search Within Graphic Files, filed concurrently herewith, the contents of which are incorporated herein by reference in their entirety.

The object generator 26 may also create the object file 28 so as to define the identity of the textual part information corresponding to the respective parts in the legacy graphic file 22. The identity of the textual part information is generally a reference or link to a location in a separate file or database where the part information corresponding to the respective reference designations and, thus, the respective parts in the legacy graphic file 22 resides. Alternatively, the application system 34 may search the database of textual parts information 35 at the time it receives a request to display the part information associated with a reference designation, such as when the user selects or points to a reference designation with a selection device, such as a mouse.

The object file 28 may also define the "hotspot" area surrounding the reference designations and instructions regarding the manner in which to present the reference designations when the selection device, such as a mouse, brushes over its hotspot. A hotspot defines an area of the graphic or an element in the graphic that is visually emphasized when the selection device, such as a mouse, brushes over the area or element. For example, to create a hotspot for the callout reference designation "A" in FIG. 2, the object generator 26 may identify a region over the callout reference designation "A". The object generator 26 then includes the hotspot instructions in the object file 28 to define the bounds of the hotspot and the manner in which the hotspot is to be depicted, such as by being highlighted or magnified or the like. Further explanation of at least some of the foregoing features of the method, computer program product, and system 20 of the present invention described above may be found in U.S. patent application Ser. No. 09/615,499, entitled Intelligent Wiring Diagram System, filed on Jul. 13, 2000, the contents of which are incorporated herein by reference in their entirety.

Below are examples of portions of XML object files for the portion of the graphic containing the callout reference designation "A," the detail label reference designation "A," and the item number reference designation "40" of the graphic depicted in FIG. 2. The portion of the parts information file for the segment of the graphic containing the callout reference designation "A" is shown below:

```
<object id="Callout3_A" role="GRAPHICREF" magtext="Callout A">
    <callout id="Callout3c_A" hslistid="hs3">
        <refint id="Callout3cr_A" refid="Detail_A">A</refint>
    </callout>
</object>
<hslist id="hs3">
    <hotspot>
        <substring id="ss3" text="A"
            font="OCRB" charheight="71" x="975" y="2444" width="71"
            height="71">
        </substring>
    </hotspot>
</hslist>
``` wherein the information between "<object id= . . . " and "</object>" indicates the object containing a graphic reference from a callout reference designation to a detail label reference designation. The object information also contains the instructions regarding the manner in which to display the callout reference designation when the hotspot for the callout is brushed over with the selection device, such as a mouse. In particular, the information between "<callout id= . . . " and "</callout>" indicates the callout reference designation and the information between "<refint id= . . . " and "</refint>" indicates that the detail label reference designation "A" is the target of the callout reference designation "A." The information between "<hslist id= . . . " and "</hslist>" lists one or more hotspots associated with the callout reference designation "A." In particular, the information between "<hotspot> . . . " and "</hotspot>" lists the only hotspot in this list directing the system 20 to navigate to the detail label reference designation "A" when the hotspot is selected. In addition, the information between "<substring id= . . . " and "</substring>" contains the text character and text box details for the callout reference designation to assist the automated text recognition and text search.

The portion of the parts information file for the segment of the graphic containing the detail label reference designation "A" is shown below:

```
<object id="Detail_A" role="DETAIL">
  <para id="DetailP_A" hslistid="hs30" text="A">A
  </para>
</object>
<hslist id="hs30">
  <hotspot>
    <substring id="ss30" text="A"
      font="OCRB" charheight="107" x="884" y="133" width="105"
      height="107">
    </substring>
  </hotspot>
</hslist>
``` wherein the information between "<object id= . . . " and "</object>" indicates the object containing a detail label referred to by a separate callout reference designation object. In particular, the information between "<para id= . . . " and "</para>" indicates the block of text representing the detail label reference designation, "A," and refers to a hotspot list for the detail label reference designation. The information between "<hslist id= . . . " and "</hslist>" lists one or more hotspots associated with the detail label reference designation "A." In particular, the information between "<hotspot> . . . " and "</hotspot>" lists the only hotspot in this list and this information may also contain directions to the system regarding what to do when the detail label reference designation is selected. Nevertheless, because detail label reference designations are typically the target of the callout reference designation, directions to the system 20 upon selection of the detail label reference designation usually are not included. In addition, the information between "<substring id= . . . " and "</substring>" contains the text character and text box details for the detail label reference designation to assist the automated text recognition and text search.

The portion of the parts information file for the segment of the graphic containing the item number reference designation "40" is shown below:

```
<object id="Item18_40" role="TEXTREF">
  <callout id="Item18c_40" hslistid="hs31" text="40">
    <textref id="Item18cr_40" refman="IPB" refloc="40">40
    </textref>
  </callout>
  <para id="Item18p_40" hslistid="hs31" text="40">40</para>
</object>
<hslist id="hs31">
  <hotspot>
    <substring id="ss31" x="1365" y="360" width="41"
      height="34" start="1" end="2"
      font="OCRB" charheight="34" text="40">
    </substring>
  </hotspot>
</hslist>
``` wherein the information between "<object id= . . . " and "</object>" indicates the object containing an item number reference designation that refers to textual information, called a text reference. In particular, the information between "<callout id= . . . " and "</callout>" indicates that the text reference may be named callouts when the text references indicate other detail label reference designations or item number reference designations. The information between "<textref id= . . . " and "</textref>" indicates the target of the callout (as described immediately above), here the target is a reference manual, "refman" with reference location "refloc" directed to item number "40." The information between "<para id= . . . " and "</para>" indicates the block of text representing the item number reference designation, "40," and refers to a hotspot list for the item number reference designation. The information between "<hslist id= . . . " and "</hslist>" lists one or more hotspots associated with the item number reference designation "40." In particular, the information between "<hotspot> . . . " and "</hotspot>" lists the only hotspot in this list and directs the system 20 to display the textual part information when the hotspot is selected. In addition, the information between "<substring id= . . . " and "</substring>" contains the text character and text box details for the detail label reference designation to assist the automated text recognition and text search.

One advantageous embodiment of the method, computer program product, and system 20 of the present invention provides that the graphic builder 30 depicted in FIG. 1 merge the information from the object file 28 and the legacy graphic file 22 to form an intelligent graphics file 32. The format of the intelligent graphics file 32 may be an electronic format that allows the drawing to be interactive, such as a format that may enable functionality to be embedded in the graphic. One type of interactive format is a vector graphic format, for example a computer graphics metafile (CGM) format. To be embedded in the intelligent graphics file 32, the legacy graphic file 22, typically in raster graphic format, must be converted to a bitmap format. One type of bitmap format is the tag interchange file format (TIFF). To embed data from the object file 28 and the legacy graphic file 22, the intelligent graphics file 32 may contain application program structures to receive the data from the object file 28 and the graphics from the legacy graphic file 22 and provide functionality. Typically, hundreds of application program structures may exist in an intelligent graphics file 32 for a single graphic, one of which may be associated with each embedded graphic and/or data structure from the object file 28 and the legacy graphic file 22.

One type of application program structure (APS) is a hotspot APS, which may be used for any elements in the graphic that are selectable or that are responsive when pointed to, such as reference designations. In accordance with one embodiment of the present invention, the hotspot APS for a reference designation may contain a data field with the information that enables linking to the target reference designation and automatic panning and zooming features. The hotspot APS also may contain another type of APS that defines the region surrounding the elements that are selectable or that are responsive when pointed to. For the reference designations described above, this APS may define the region around the reference designation, provide magnified text upon pointing to or selection, and/or provide directions regarding the manner in which to access the textual parts information that may appear when an item number reference designation is pointed to or selected.

In the same way as the object file 28 may define the identity of textual parts information to display, as discussed above, the APS may provide directions regarding the textual parts information to display when the corresponding reference designations are pointed to or selected by defining links in the intelligent graphics file 32 to the textual parts information database 35. The links identify the textual parts information in the database 35 that are associated with respective reference designations in the intelligent graphics file 32 such that upon selection or pointing to the respective reference designation, the corresponding textual parts information is displayed. Alternatively, the directions provided by the APS regarding the textual parts information to display when the reference designations are pointed to or selected may instruct the application system 34 to search the database 35 for textual parts information associated with the respective reference designations. Thus, upon selection of or pointing to the respective reference designation, the application system 34 obtains and displays the corresponding textual parts information is obtained from the database 35.

A further type of APS is a layer APS, which may provide the information needed to change the elements of the graphic representation. The layer application program structure may contain the directions that may be used to change the graphical representation of the reference designation when the results of a text search are contained in the text block of the reference designation. Thus, if a respective reference designation is contained in the results of a text search, the layer APS turns "on" the region surrounding the reference designation and the reference designation such that it is highlighted in a bright color, such as red.

FIG. 3 illustrates an example of functions defined by the APS within the hotspot APS and the layer APS for part number "19." While the layer APS highlights the item number reference designation "19," the APS within the hotspot APS magnifies the item number reference designation "19," and provides the directions to obtain the textual part information. As is explained below, the textual part information corresponding to reference designation "19" appears in the box 62 because the reference designation is pointed to, but not selected.

As described above, the application program structures of the intelligent graphics file 32 may enable automatic linking between related reference designations and automatic display of textual parts information when a corresponding reference designation is selected or pointed to in one embodiment of the method, computer program product, and system 20 of the present invention. In this regard, a user may view a graphic representation of an article and may select the corresponding reference designation (source reference) that is related to the reference designation (target reference) for a detailed depiction of a portion or part of the article. The method, computer program product, and system 20 of the present invention then provide for the target reference to be automatically displayed in a manner described below. The graphic representation of the article may consist of a graphic representation of one sheet or many sheets and the target reference may be located on the same sheet as the source reference or may be located on a different sheet than the source reference.

In addition, the method, computer program product, and system 20 of the present invention include embodiments that enable automatic linking between related reference designations of the intelligent graphic file 32 depicting parts and textual parts information with intelligent graphics files depicting the same parts in a different configuration, such as in a wiring diagram or a maintenance manual. For example, one intelligent graphics file depicting one configuration containing a part may have a link to another intelligent graphics file depicting the same part in a different configuration. As such, when the part is selected in the first intelligent graphics file, the intelligent graphics viewer 36 automatically displays the same part in the other configuration as depicted in the linked intelligent graphic file. The functionality of this embodiment may be valuable to users that locate a faulty part in a wiring diagram, for instance, and want to view the parts catalog depiction of the part and the associated textual information for that part. Alternatively, a user may select a reference designation in a graphical representation of a parts catalog, maintenance manual, wiring diagram or other depiction and a list of all the other graphical representations may be displayed such that the user may choose in which depiction to view the part associated with the selected reference designation. Further details regarding automated linking between graphics is provided in U.S. Ser. No. 09/971,283 entitled The Method, Computer Program Product, and System for Performing Automated Linking Between Sheets of a Drawing Set, filed concurrently herewith, the contents of which are incorporated herein by reference in their entirety.

The viewing of and navigation about a graphic, the display of the corresponding textual part information, and the selection of various reference designations are generally provided by an intelligent graphics viewer 36. The intelligent graphics viewer 36 includes the user interface that allows a user to interact with the display by moving a cursor via a selection device, such as a mouse, to indicate related reference designations and to indicate selection of reference designations. The intelligent graphics viewer 36 may be part of the application system 34, depicted in FIG. 1. The application system 34 also may contain a database management system 35 with all of the information about the graphics and the parts information corresponding to the graphics. The application system 34 also may provide the user with the ability to turn on or off any of the automated features. Thus, the application system 34 may allow the user to customize the system 20 at any time while using the system 20. FIG. 3 is a representative display provided by the application system 34. The application system 34 may provide an intelligent graphic explorer 50 that may embody the intelligent graphics viewer display 60, which is part of the intelligent graphics viewer 36, according to the method, computer program product, and system 20 of one embodiment of the present invention. The intelligent graphic explorer 50 of FIG. 3 may enable the user to view and navigate among the parts of an article depicted in a graphic and to view the corresponding textual parts information.

The intelligent graphic explorer 50 may present a display that may be configured in any form. For example, in FIG. 3, the intelligent graphic explorer 50 is configured so that the top section of the display may depict the system and drawing information 52 that may be provided by the database management system 35 in the application system 34. The section on the left of the display may show the table of contents 54 and the search function 56 for the graphics or other information that may be provided by the database management system 35 in the application system 34. The section at the bottom of the display may present a scrollable and searchable database view 58 for the database of textual parts information. The intelligent graphics viewer display 60, which is part of the intelligent graphic viewer 36, is embedded within the intelligent graphic explorer 50 and creates the portion of the display shown in FIG. 3 to be located to the right of the table of contents 54.

The intelligent graphic explorer 50 depicted in FIG. 3 may provide the interface for the functionality provided by the application system 34 and the intelligent graphic viewer 36.

For example, the intelligent graphics viewer 36 may permit a user to view the graphic stored by the intelligent graphic file 32 and depicted in the intelligent graphics viewer display 60 of FIG. 3. The user then may choose to point to the item/part number reference designation "19" with the selection device, such as a mouse, and the intelligent graphic viewer 36 automatically presents the graphic as instructed in the APS. For example, for this item/part number reference designation, the APS instructs the intelligent graphic viewer 36 to magnify the reference designation "19" and display the textual part information associated with the reference designation "19." As referred to above, because the reference designation is pointed to, but not selected, the intelligent graphic viewer 36 displays the textual information in the box 62 as shown in FIG. 3. FIG. 4 depicts the intelligent graphic explorer 50 when the viewer chooses to select the reference designation "19" in FIG. 3. Upon selection of the reference designation "19," the APS instructs the intelligent graphic viewer 36 to display the textual part information associated with the reference designation "19." Because the reference designation is selected, not pointed to, the intelligent graphic viewer 36 automatically displays the textual part information 66 for reference designation "19" in the database view 58, as shown in FIG. 4.

FIGS. 5 through 10 further illustrate the features of the method, computer program product, and system 20 of various embodiments of the present invention. In all of the examples to follow, the figures are representative of the views that a user may observe via the intelligent graphic viewer 36.

The embodiment of the present invention shown in FIG. 5 demonstrates the resulting view when the item/part number reference designation "20" is selected in the database view 58. The APS for item/part number reference designation "20" instructs the intelligent graphics viewer 36 to automatically pan and zoom to the region of the graphic surrounding reference designation "20" and to highlight reference designation "20." FIG. 6 similarly illustrates the present invention when the item/part number reference designation is selected in the database view 58. In FIG. 6, however, more than one item with the same item/part number reference designation exists on the graphic. Thus, when the item/part number reference designation "24" is selected in the database view 58, the APS for item/part number reference designation "24" instructs the intelligent graphics viewer 36 to automatically pan and zoom to the area of the graphic that contains all of the reference designations "24." The manner in which the present invention enables display of the portion of the graphic depicting the region surrounding the item/part number reference designation(s) upon selection of the item/part number in the database view 58 and vice versa demonstrates the usefulness of the present invention for efficiently searching graphics and the database information regarding the parts depicted in the graphics.

FIG. 7 depicts an embodiment of the present invention displaying a graphic representation of an article on one of a plurality of sheets within a drawing set. When the user selects the callout reference designation "H," the APS associated with callout reference designation "H" instructs the intelligent graphic viewer 36 to highlight the reference designation "H" and to display and magnify the reference designation label "Callout H." In addition, the APS instructs the intelligent graphic viewer 36 to display the sheet containing the target detail label reference designation "H," which is located on a different sheet. FIG. 8 is the display of the different sheet of the intelligent graphics file 32 where the detail label reference designation "H" is located. The APS also instructs the intelligent graphic viewer 36 to highlight the detail label reference designation "H" to direct the user's attention to the appropriate area of the display.

Another embodiments of the method, computer program product, and system of the present invention, shown in FIG. 9, combines the intelligent graphic file 32 depicting parts and textual parts information with the intelligent graphics file depicting the same parts in a wiring diagram. FIG. 9 depicts an intelligent wiring diagram in which the battery "M1885" is selected. The intelligent graphics file depicting the wiring diagram may have a link to the intelligent graphics file 32 depicting the parts information. FIG. 10 shows that when a user selects the battery "M1885" in the wiring diagram, the intelligent graphics viewer 36 automatically displays a parts catalog depiction of the battery 84 and the textual part information 86 associated with the battery from the parts information database 35. In addition, the intelligent graphics viewer 36 highlights the reference designation 88 for the battery and zooms to the portion of the graphic surrounding the reference designation 88, as instructed by the APS associated with the reference designation 88. Alternatively, after the battery "M1885" is selected, the intelligent graphics viewer 36 may display a list of all the graphics depicting the battery "M1885." As such, once the user request that the intelligent graphics viewer 36 present parts information corresponding to the battery "M1885," by selecting the parts graphic from the list, the intelligent graphics viewer 36 may present the graphical representation of the corresponding battery 84 and the textual part information from the parts information database 35.

The system 20 of the present invention and, in particular, the recognition application 24, the object generator 26, the graphic builder 30, the application system 34, and the intelligent graphics viewer 36, are typically embodied by a processing element and an associated memory device, both of which are commonly comprised by a computer or the like. As such, the system of the present invention generally operates under control of a computer program product to provide the functionality described hereinabove in conjunction with the various components of the system, according to another aspect of the present invention. The computer program product for performing the contingent claim valuation includes a computer-readable storage medium, such as the non-volatile storage medium, and computer-readable program code portions, such as a series of computer instructions, embodied in the computer-readable storage medium.

In this regard, FIG. 1 is a block diagram and flowcharts of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block (s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Thus, the method, computer program product, and system 20 of the present invention provide for automatically building an intelligent graphics file having both graphic representations of the parts of articles and embedded data structures defining related reference designations associated with the graphic representations of the same part. The present invention may also provide for automatically displaying parts information corresponding to the part represented by a selected reference designation. The textual parts information may be displayed whether the respective reference designation is pointed to or selected. Furthermore, the parts information may be obtained from a database that stores the textual parts information associated with the parts of the article. The features of the various embodiments of the present invention provide users and electronic graphic system builders with an efficient and accurate approach to creating and viewing intelligent graphics files that include navigation among reference designations for the same part and access to textual information associated with the parts, which completely avoids the time-consuming and expensive steps of the other approaches.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of creating an intelligent graphics file including information associated with a plurality of parts of at least one article, the method comprising:

providing a graphic representation of the plurality of parts of the at least one article;

providing information identifying a plurality of reference designations for the plurality of parts of the at least one article that are graphically represented;

constructing a computer readable object defining the position and content of related reference designations to thereby define at least two reference designations that refer to the same part; and combining the graphic representation and the computer readable object to create the intelligent graphics file having both graphic representations of the plurality of parts of the at least one article and embedded data structures defining related reference designations associated with the graphic representations of the same part.

2. A method according to claim 1, further comprising providing textual information associated with the plurality of parts of the article and wherein constructing the computer readable object comprises identifying the textual information corresponding to a respective part of the article.

3. A method according to claim 2, wherein providing textual information comprises providing a database of textual information associated with the plurality of parts of the article.

4. A method according to claim 1, wherein constructing the computer readable object comprises including an instruction for magnifying the related reference designations.

5. A computer program product for creating an intelligent graphics file including information associated with a plurality of parts of at least one article, the computer program product comprising a computer-readable storage medium having computer-readable program code portions stored therein, the computer-readable program code portions comprising:

a first executable portion capable of providing a graphic representation of the plurality of parts of the at least one article;

a second executable portion capable of providing information identifying a plurality of reference designations for the plurality of parts of the at least one article that are graphically represented;

a third executable portion capable of constructing a computer readable object defining the position and content of related reference designations to thereby define at least two reference designations that refer to the same part; and a fourth executable portion capable of combining the graphic representation and the computer readable object to create the intelligent graphics file having both graphic representations of the plurality of parts of the at least one article and embedded data structures defining related reference designations associated with the graphic representations of the same part.

6. A computer program product according to claim 5, further comprising a fifth executable portion capable of providing textual information associated with the plurality of parts of the article and wherein said third executable portion is also capable of identifying the textual information corresponding to a respective part of the article.

7. A computer program product according to claim 5, wherein said third executable portion is also capable of including an instruction for magnifying the related reference designations.

8. A system for creating an intelligent graphics file including information associated with a plurality of parts of at least one article, the system comprising:

a memory device for storing a graphic representation of the plurality of parts of the at least one article, said memory device also for storing information identifying a plurality of reference designations for the plurality of parts of the at least one article that are graphically represented; and a processing element capable of constructing a computer readable object defining the position and content of related reference designations to thereby define at least two reference designations that refer to the same part, said processing element also capable of combining the graphic representation and the computer readable object to create the intelligent graphics file having both graphic representations of the plurality of parts of the at least one article and embedded data structures defining related reference designations associated with the graphic representations of the same part.

9. A system according to claim 8, wherein said memory device further stores textual information associated with the plurality of parts of the article and wherein said processing element is further capable of constructing the computer readable object to identify the textual information corresponding to a respective part of the article.

10. A system according to claim 9, wherein said memory device further stores the textual information in a database of textual information associated with the plurality of parts of the article.

11. A system according to claim 8, wherein said processing element is further capable of constructing the computer readable object including an instruction for magnifying the related reference designations.

12. A method of viewing an intelligent graphics file including information associated with a plurality of parts of at least one article, the method comprising:
providing the intelligent graphics file, wherein providing the intelligent graphics file comprises providing both graphic representations of the plurality of parts of the at least one article and embedded data structures stored in the intelligent graphics file defining related reference designations associated with the graphic representations of the same part;
displaying a graphical image of at least a portion of the article based on the graphic and embedded data structures stored in the intelligent graphics file;
receiving a selection of a reference designation associated with the part of the article being displayed;
displaying textual information associated with the selected part of the article; and
concurrently displaying a graphical representation of the part of the article associated with the selected reference designation.

13. A method according to claim 12, wherein providing the intelligent graphics file further comprises providing a graphic representation of a plurality of sheets of a drawing set depicting the plurality of parts of the at least one article and wherein displaying a graphical representation of the part of the article associated with the selected reference designation comprises displaying the graphical representation of the part on a different sheet of the drawing set than the sheet from which the reference designation was selected.

14. A method according to claim 12, further comprising pointing to a reference designation associated with a part of the article being displayed; and displaying a window containing textual information for the part associated with the reference designation that has been pointed to prior to the selection of the reference designation.

15. A method according to claim 12, further comprising providing a link in the intelligent graphics file and associating the link with a respective reference designation to associate the respective reference designations with corresponding textual information; and obtaining the textual information upon at least one of a selection of or pointing to the respective reference designation for display.

16. A method according to claim 12, further comprising providing a database containing textual information associated with the respective reference designation; and obtaining the textual information from the database upon at least one of a selection of or pointing to the respective reference designation for display.

17. A method according to claim 12, further comprising displaying a portion of a graphical representation of an electrical wiring diagram depicting the part associated with the selected reference designation.

18. A computer program product for viewing an intelligent graphics file including information associated with a plurality of parts of at least one article, the computer program product comprising a computer-readable storage medium having computer-readable program code portions stored therein, the computer-readable program code portions comprising:
a first executable portion capable of providing the intelligent graphics file, wherein said first executable portion is also capable of providing both graphic representations of the plurality of parts of the at least one article and embedded data structures stored in the intelligent graphics file defining related reference designations associated with the graphic representation of the same part;
a second executable portion capable of displaying a graphical image of at least a portion of the article based on the graphic and embedded data structures stored in the intelligent graphics file;
a third executable portion capable of receiving a selection of a reference designation associated with the part of the article being displayed;
a fourth executable portion capable of displaying textual information associated with the selected part of the article; and
a fifth executable portion capable of concurrently displaying a graphical representation of the part of the article associated with the selected reference designation.

19. A computer program product according to claim 18, further comprising a sixth executable portion capable of providing a graphic representation of a plurality of sheets of a drawing set depicting the plurality of parts of the at least one article and wherein said fifth executable portion is also capable of displaying the graphical representation of the part on a different sheet of the drawing set than the sheet from which the reference designation was selected.

20. A computer program product according to claim 18, further comprising a sixth executable portion also capable of displaying a window containing textual information for the part associated with a reference designation that has been pointed to prior to the selection of the reference designation.

21. A computer program product according to claim 18, wherein said first executable portion is further capable of providing a link in the intelligent graphics file and associating the link with a respective reference designation with corresponding textual information and further comprising a sixth executable portion capable of obtaining the textual information upon at least one of a selection of or pointing to the respective reference designation for display.

22. A computer program product according to claim 18, further comprising a sixth executable portion capable of providing a database containing textual information associated with the respective reference designation and a seventh executable portion capable of obtaining the textual information from the database upon at least one of a selection of or pointing to the respective reference designation for display.

23. A computer program product according to claim 18, further comprising a sixth executable portion capable of displaying a portion of a graphical representation of an electrical wiring diagram depicting the particular part associated with the selected reference designation.

24. A system for viewing an intelligent graphics file including information associated with a plurality of parts of at least one article, the system comprising:

a memory device for storing the intelligent graphics file having both graphic representations of the plurality of parts of the at least one article and embedded data structures defining related reference designations associated with the graphic representations of the same part;

a user interface capable of indicating that the reference designation associated with a particular part of the article is related to the reference designation associated with a different depiction of the same part of the article, said user interface also capable of indicating that the reference designation is selected; and a processing element capable of displaying a graphical image of at least a portion of the article based on the graphic and embedded data structures stored in the intelligent graphics file, said processing element also capable of responding to a selection of the reference designation associated with the part of the article being displayed, said processing element also capable of displaying textual information associated with the selected part of the article, and said processing element further capable of concurrently displaying a graphical representation of the part of the article associated with the selected reference designation.

25. A system according to claim 24, wherein said memory device also stores a graphic representation of a plurality of sheets of a drawing set depicting the plurality of parts of the at least one article and wherein said processing element is further capable of displaying the graphical representation of the part of the article associated with the selected reference designation on a different sheet of the drawing set than the sheet from which the reference designation was selected.

26. A system according to claim 24, wherein said processing element is further capable of pointing to a reference designation associated with a part of the article being displayed and displaying a window containing textual information for the part associated with the reference designation that has been pointed to prior to the selection of the reference designation.

27. A system according to claim 24, wherein said memory device also stores a link in the intelligent graphics file associated with a respective reference designation to associate the respective reference designation with corresponding textual information and wherein said processing element is further capable of obtaining the textual information upon at least one of a selection of or pointing to the reference designation for display.

28. A system according to claim 24, wherein said memory device also stores a database containing textual information associated with respective reference designations and wherein said processing element is further capable of obtaining the textual information from the database upon at least one of a selection of or pointing to the respective reference designation for display.

29. A system according to claim 24, wherein said processing element is further capable of displaying a portion of a graphical representation of an electrical wiring diagram depicting the part associated with the selected reference designation.

* * * * *